United States Patent [19]

Funk et al.

[11] Patent Number: 5,610,218
[45] Date of Patent: Mar. 11, 1997

[54] ORGANOPOLYSILOXANE COMPOSITIONS WHICH ARE STABILIZED TO HEAT AND CAN BE CROSSLINKED TO GIVE ELASTOMERS

[75] Inventors: Enno Funk, Burghausen; Norbert Egerter, Mehring; Sabine Schreyer, Burghausen; Frank Achenbach, Simbach; Herbert Barthel, Emmerting, all of Germany

[73] Assignee: Wacker-Chemie GmbH, Munich, Germany

[21] Appl. No.: 368,183

[22] Filed: Jan. 4, 1995

[30] Foreign Application Priority Data

Jan. 20, 1994 [DE] Germany .................. 44 01 606.9

[51] Int. Cl.$^6$ ..................................... C08K 3/10
[52] U.S. Cl. ................ 524/413; 524/423; 524/434; 524/588
[58] Field of Search ..................... 524/413, 423, 524/434, 588

[56] References Cited

U.S. PATENT DOCUMENTS

| | | |
|---|---|---|
| 2,999,076 | 9/1961 | Talcott . |
| 3,435,000 | 3/1969 | Bluestein . |
| 4,288,492 | 9/1981 | Hiromae et al. .................. 428/336 |
| 4,347,175 | 8/1982 | Shustova et al. .................. 523/455 |
| 4,360,388 | 11/1982 | Nauroth et al. .................. 524/588 |
| 4,528,313 | 7/1985 | Swihart et al. .................. 524/397 |
| 4,777,087 | 10/1988 | Heeks et al. .................. 428/321.1 |
| 4,824,903 | 4/1989 | Aizawa et al. .................. 524/783 |
| 4,925,895 | 5/1990 | Heeks et al. .................. 524/714 |
| 5,086,107 | 2/1992 | Arai et al. .................. 524/424 |
| 5,204,384 | 4/1993 | Matsushita et al. .................. 524/413 |
| 5,246,979 | 9/1993 | Lutz et al. .................. 522/42 |

FOREIGN PATENT DOCUMENTS

| | | |
|---|---|---|
| 0033843 | 8/1981 | European Pat. Off. . |
| 0049980 | 4/1982 | European Pat. Off. . |
| 2543849 | 4/1977 | Germany . |
| 2607185 | 12/1977 | Germany . |
| 2752097 | 4/1982 | Germany . |
| 4336345 | 8/1994 | Germany . |

OTHER PUBLICATIONS

Document No. 08/326903 Oct. 21, 1994 H. Barthel et al.
J. C. Weis: Progress of Rubber Technology, Ed. S. H. Morell, pp. 85–106 Elsevier Appl. Science Publishers Ltd., Engl., 1984 "Silicone Rubber".
J. M. Nielsen, "Oxidative Stabilization of Silicone Fluids" in Advances in Chemistry Series 85, Ed. R. F. Gould, American Chemical Society, Washington D.C. 1968.

Primary Examiner—Mark D. Sweet

[57] ABSTRACT

Organopolysiloxane compositions which are stabilized to heat and can be crosslinked to give elastomers, which as stabilizer combination contain (D) a copper compound in an amount from 1 to 180 ppm by weight calculated as elemental copper and (E) a zinc compound in an amount of from 1 to 180 ppm by weight calculated as elemental zinc, in each case based on the total weight of the organopolysiloxane composition which is stabilized to heat and can be crosslinked to give elastomers, and (F) optionally, organic fatty acid.

12 Claims, No Drawings

ORGANOPOLYSILOXANE COMPOSITIONS WHICH ARE STABILIZED TO HEAT AND CAN BE CROSSLINKED TO GIVE ELASTOMERS

FIELD OF INVENTION

The present invention relates to organopolysiloxane compositions which can be crosslinked to give elastomers and which contain, as heat stabilizer, copper and zinc compounds and optionally, fatty acid and a process for preparing these compositions.

BACKGROUND OF INVENTION

Silicones have a special position among elastomers, since their mechanical parameters and their physical properties change only slightly with temperature. In a unique fashion, extreme cold flexibility is combined with excellent hot-air resistance. However, at high temperatures of above 180° C., even silicones are subject to appreciable heat ageing which in the case of silicone elastomers leads to changes in the mechanical properties such as, Shore hardness, tensile strength and elongation at break. Possible causes are inter alia, oxidative processes, thermal chain scission and also reorganization of the siloxane network under the catalytic action of inherent impurities, often in association with unavoidable traces of water. Furthermore, dimethylsiloxane chains having terminal siloxanol groups can be thermally degraded with elimination of low-molecular-weight rings.

The hot air ageing of silicone vulcanizates generally becomes apparent purely qualitatively in an embrittlement of the material which increases with temperature and time and is associated with an increasing loss of elasticity.

The thermal and oxidative degradation of silicones and their stabilization by suitable additives has been studied for some time, with transition metals and their compounds having had particular importance from the beginning. On this subject, reference may be made to J. M. Nielsen: "Oxidative Stabilization of Silicone Fluids" in: "Advance in Chemistry Series 85 (Stabilization of Polymers and Stabilizer Processes)", Ed. R. F. Gould, American Chemical Society, Washington D.C. 1968. As heat stabilizers for silicone rubber, use is most frequently made of compounds of the lanthanides, in particular cerium, but also compounds of iron, zirconium and titanium, preferably the 2-ethylhexanoates, chlorides, oxides and siloxanolates.

Copper compounds as heat stabilizers for silicone elastomers such as bis(ethylenediamine)copper(II) sulfate as described in U.S. Pat. No. 4,777,087 (Xerox Corp., issued on Oct. 11, 1988) or copper salts of carboxylic acids, such as copper(II) 2-ethylhexanoate, as described in U.S. Pat. No. 2,999,076 (Dow Corning Corp., issued on Sep. 5, 1961), have already been disclosed. In these publications, from 1 to 20 parts of the copper ethylenediamine complex and from 0.001 to 0.40 parts of copper as carboxylate (corresponding to from 10 to 4,000 ppm of Cu) respectively are used per 100 parts of organopolysiloxane. DE-C 27 52 097 (Sustova et al., issued on Apr. 1, 1982) describes a process for stabilizing polymers against thermal-oxidative degradation by mixing the polymers with a formate of a metal of changing valence, e.g., copper, with the salts being added in amounts of from 0.1 to 20 parts by weight per 100 parts by weight of polymer. Reference is again made to less than 0.1 parts by weight of salt per 100 parts by weight of polymer leading to an insignificant stabilizing effect.

U.S. Pat. No. 3,435,000 (General Electric Co., issued on Mar. 25, 1969) and U.S. Pat. No. 5,086,107 (Shin-Etsu Chemical Co., issued on Feb. 4, 1992) describes the use of zinc as carbonate or hydroxide for improving the oil resistance of silicone elastomers.

2-Ethylhexanoic acid is usually a constituent, as a counter ion, of heat stabilizing transition metal compounds, but has also been used in addition to acetylacetonates of iron, nickel and cerium, but not of copper. On this subject, reference is made to U.S. Pat. No. 4,528,313 (Dow Corning Corp., issued on Jul. 9, 1985).

Copper and zinc as heat stabilizers are disclosed in U.S. Pat. No. 4,824,903 (Dow Corning K.K., issued on Apr. 25, 1989). They are claimed individually or together in the form of their oxides, phosphates, silicates, carbonates and sulfates in amounts of from 10% to 90% together with acrylated silicone resins as constituents of insulation coatings of electric metal sheets. Reference is made to DE-B 26 07 185 (Nippon Steel Corp., issued on Dec. 22, 1977). Copper undecylenate and zinc acetylacetonate, are also used as heat stabilizers for UV-curable acrylamidepolysiloxane compositions in amounts of 1% by weight. Reference is made to, U.S. Pat. No. 5,246,979 (Dow Corning Corp., issued on Sep. 21, 1993) or the corresponding EP 518 142 A1.

DE-B 25 43 849 (M. P. Grinblat et al., issued on Apr. 14, 1977) describes the use of copper silicate, sulfide, borate or phosphide in an amount of from 0.2 to 50 parts by weight per 100 parts by weight of organopolysiloxane for thermally stabilizing (HTV-)organopolysiloxane compositions. The copper salts specified are used in combination with metal oxides, for example, from 2 to 10 parts by weight of zinc oxide per 100 parts by weight of silicone rubber, for improving the resistance of the vulcanizates to degradation under conditions of limited air access, reference being made to less than 0.2 part by weight of copper salt and 2 parts by weight of zinc oxide not leading to the desired improvements.

SUMMARY OF INVENTION

For the purposes of the present invention, the term organopolysiloxanes hereinafter also includes oligomeric siloxanes.

The present invention provides organopolysiloxane compositions which are stabilized to heat and can be crosslinked to give elastomers, which compositions contain as stabilizer combination (D) a copper compound in an amount of from 1 to 180 ppm by weight calculated as elemental copper, (E) a zinc compound in an amount of from 1 to 180 ppm by weight calculated as elemental zinc, in each case based on the total weight of the organopolysiloxane composition which is stabilized to heat and can be crosslinked to give elastomers, and (F) optionally, organic fatty acid.

Where the terms copper and zinc are used hereinafter, they do not refer to the ductile metals, but are used for the purposes of simplicity for compounds or ionic species of these metals.

The compositions to be stabilized by the copper/zinc stabilizer combination of the invention can be any organopolysiloxane compositions which can be crosslinked to give elastomers, for example, single-component or two-component organopolysiloxane compositions which vulcanize at room temperature (so-called RTV compositions), or elevated temperature (so-called HTV compositions), with the crosslinking carried out by condensation addition of Si-bonded hydrogen to an aliphatic multiple bond or peroxidically by formation of free radicals. The compositions to be stabilized by the copper/zinc stabilizer combination of the invention are preferably one-component organopolysiloxane compositions which can be crosslinked peroxidically.

The organopolysiloxane compositions of the invention which are stabilized to heat and can be crosslinked to give elastomers preferably comprise
(A) organopolysiloxanes consisting essentially of units of the formula $$R_a SiO_{\frac{4-a}{2}}, \quad (I)$$

where

R is identical or different and is an unsubstituted or substituted hydrocarbon radical and a is 0, 1, 2 or 3 and has an average numerical value of from 1.9 to 2.1, (B) optionally, reinforcing and/or non-reinforcing fillers,
(C) a catalyst promoting the crosslinking of the organopolysiloxane compositions or an agent effecting the crosslinking, such as, an organic peroxide,
(D) a copper compound in an amount of from 1 to 180 ppm by weight calculated as elemental copper and based on the total weight of the organopolysiloxane composition which is stabilized to heat and can be crosslinked to give elastomers,
(E) a zinc compound in an amount of from 1 to 180 ppm by weight calculated as elemental zinc and based on the total weight of the organopolysiloxane composition which is stabilized to heat and can be crosslinked to give elastomers and
(F) optionally, organic fatty acid.

Examples of unsubstituted or substituted hydrocarbon radicals R are alkyl radicals, such as the methyl, ethyl, propyl, isopropyl, tert-butyl, n-octyl, 2-ethylhexyl and octadecyl radical; alkenyl radicals such as the vinyl, allyl, hexenyl and undecenyl radical; cycloalkyl radicals such as the cyclopentyl or cyclohexyl radical; cycloalkenyl radicals such as the cyclopentenyl or cyclohexenyl radical; aryl radicals such as the phenyl, tolyl, xylyl or naphthyl radical; aralkyl radicals such as the benzyl or phenylethyl radical, and also radicals which are halogenated or substituted by functional organic groups, such as the 3,3,3-trifluoropropyl or cyanomethyl radical.

Preferred radicals R are the methyl, vinyl, phenyl and 3,3,3trifluoropropyl radicals.

Alkyl radicals, in particular methyl radicals, are preferably bound to at least 70 mole % of the Si atoms present in the organopolysiloxane comprising units of the formula (I). If the organopolysiloxanes (A) contain Si-bonded vinyl and/or phenyl radicals in addition to Si-bonded methyl and/or 3,3,3-trifluoropropyl radicals, the vinyl and/or phenyl radicals are preferably present in amounts of 0.001–30 mole %.

However, it is also possible to use organopolysiloxanes (A) in which up to 50 mole % of the radicals R are hydrogen atoms.

The organopolysiloxanes (A) preferably comprise diorganosiloxane units. The end groups of the organopolysiloxanes (A) can be trialkylsiloxy groups, in particular the trimethylsiloxy radical or the dimethylvinylsiloxy radical; it is also possible for one or more of these alkyl groups to be replaced by hydrogen, hydroxy groups of alkoxy groups such as methoxy or ethoxy radicals.

The organopolysiloxanes (A) can be liquids or highly viscous substances. The organopolysiloxanes (A) preferably have a viscosity between 100 mPa.s and 100,000 Pa.s, which is preferably measured using a Brookfield viscosimeter.

The organopolysiloxanes (A) can be either one type of organopolysiloxane or at least two different types of such siloxanes.

The organic fatty acids (F) are preferably 2-ethylhexanoic acid, undecanoic acid, 10-undecenoic acid, palmitic acid, stearic acid and naphthenic acids, with more preference being given to 2-ethylhexanoic acid.

The organopolysiloxane compositions of the present invention preferably contain the organic fatty acid (F) in amounts of from 0 to 300 ppm by weight (parts by weight per million parts by weight), particularly preferably from 50 to 150 ppm by weight, in each case based on the total weight of the organopolysiloxane composition of the invention which is stabilized to heat and can be crosslinked to give elastomers.

The organic fatty acids (F) can be either one type of organic fatty acid or two or more different types of such fatty acids.

The fillers (B) used can be all fillers which have been used in organopolysiloxane compositions which can be crosslinked to give elastomers, with preference being given to pyrogenic or precipitated silicas having BET surface areas of at least 50 m²/g.

Examples of reinforcing fillers are pyrogenic or precipitated silicas having BET surface areas of at least 50 m²/g and also furnace black and acetylene black.

The silica fillers specified can have hydrophilic character or can be hydrophobicized by known methods. Reference is made to DE 38 39 900 A (Wacker-Chemie GmbH, filed on Nov. 25, 1988). The hydrophobicization is generally carried out using from 1% to 20% by weight of hexamethyldisilazane and/or divinyltetramethyldisilazane and from 0.5% to 5% by weight of water, in each case based on the total weight of the organopolysiloxane composition, with these reagents advantageously being added to the previously charged organopolysiloxane in a suitable mixing apparatus, such as kneaders or compounders, before successively incorporating the hydrophilic silica into the composition.

Examples of non-reinforcing fillers are quartz flour, diatomaceous earth, calcium silicate, zirconium silicate, zeolites, metal oxide powder such as aluminum, titanium, iron or zinc oxide, barium silicate, barium sulfate, calcium carbonate, gypsum, and also plastic powder such as polyacrylonitrile powder or polytetrafluoroethylene powder. The fillers used can also be fibrous components such as glass fibres and plastic fibres. The BET surface area of these fillers is preferably below 50 m²/g.

If zirconium silicate is used as filler (B), the content of organic fatty acid, in particular 2-ethylhexanoic acid, is more preferably from 200 to 300 ppm by weight, based on the total weight of the composition of the invention which can be crosslinked to give elastomers.

The fillers (B) can be either one type of filler or at least two different types of such fillers.

The organopolysiloxane compositions of the invention which can be crosslinked to give elastomers contain the filler (B) in amounts of preferably from 1 to 200 parts by weight, more preferably from 30 to 100 parts by weight, in each case based on 100 parts by weight of organopolysiloxane (A).

The component (C) can be a crosslinking catalyst or generally an agent which initiates or effects the crosslinking, which have been used in compositions which can be crosslinked to give elastomers. The catalysts or agents (C) which are to be used depend on the crosslinking system. Thus, single-component silicone hot-vulcanizing rubbers (HTV rubbers) are preferably crosslinked peroxidically at temperatures above 100° C., while addition-crosslinking, two-component HTV and RTV rubbers are, in contrast, preferably crosslinked by means of a noble metal catalyst based on a metal of the subgroup 8, with preference given to platinum and its compounds as catalysts.

Two-component condensation-crosslinking RTV silicone rubbers preferably vulcanize under the catalytic action of tin(IV) compounds, while single-component RTV compositions vulcanize through from the surface under the action of atmospheric moisture.

The component (C) used in the organopolysiloxane compositions of the invention is preferably a peroxide, such as dibenzoyl peroxide, bis(2,4-dichlorobenzoyl)peroxide, dicumyl peroxide and 2,5-bis(tert-butylperoxy) 2,5-dimethylhexane or mixtures thereof, with preference given to bis(2,4-dichlorobenzoyl) peroxide and dicumyl peroxide.

The organopolysiloxane compositions of the invention which can be crosslinked to give elastomers contain the peroxide (C) in amounts of preferably from 0.4% to 2.0% by weight, more preferably from 0.7% to 1.5% by weight, based on the total weight of the organopolysiloxane composition.

Examples of the copper component (D) are inorganic copper salts, such as $CuCl_2$ and $CuSO_4$, and also fatty acid salts of copper, such as the salt of 2-ethylhexanoic acid.

Examples of the zinc component (E) are inorganic zinc salts such as $ZnCl_2$ and $ZnSO_4$, and also fatty acid salts of zinc, such as the salt of 2-ethylhexanoic acid.

The copper component (D) or zinc component (E) can be used as an inorganic salt in pure form or, more preferably, as an aqueous solution.

Fatty acid salts of copper or zinc are preferably used in pure form or dissolved in an inert, preferably nonpolar, organic solvent, such as aliphatic or aromatic hydrocarbons.

It has been found to be advantageous to use zinc and copper in the form of metal-doped silica as described in the German Application No. P 43 36 345.8 (Wacker-Chemie GmbH; filed on Oct. 25, 1993). The metal-doped silica is preferably prepared by a process in which hydrophilic silica is mixed with (a) a liquid transition metal compound or such a compound dissolved in water or an organic solvent and
(b) an organic or organosilicon hydrophobicizing agent.

If silica doped with copper and zinc is used as components (D) and (E), the amount of filler (B) used can be correspondingly reduced or the addition of filler (B) can be omitted.

The silica doped with copper and zinc according to the cited German Application No. P 43 36 345.8 can also be mixed with metal-free pyrogenic or precipitated silica, which can be hydrophilic or hydrophobicized, without the heat stability of the silicone vulcanizates prepared therewith being impaired.

Addition of the copper-doped and zinc-doped silica described gives high heat stability even without the addition of organic fatty acid.

The components (D) and (E) used are preferably $CuCl_2$ and $ZnCl_2$.

The components (D) and (E) are used in such amounts that the concentrations of copper and zinc are each, independently of one another, from 1 to 180 ppm by weight of copper or zinc, preferably from 2 to 90 ppm by weight of copper or zinc, more preferably from 4 to 40 ppm by weight of copper or zinc, in each case calculated as elemental copper or elemental zinc and based on the total weight of the organopolysiloxane composition of the invention which is stabilized to heat and can be crosslinked to give elastomers.

As appropriate to the respective application, processing aids (G) and additives (H), such as pigments and preservatives, can be added to the organopolysiloxane compositions of the invention which are stabilized to heat and can be vulcanized to give elastomers.

The compositions of the invention preferably contain no materials further to those specified above.

The preparation of the organopolysiloxane compositions of the invention can be carried out by known methods, such as by simple mixing of the individual components.

In the preparation of the organopolysiloxane compositions of the invention based on organopolysiloxanes (A) and hydrophilic silica as reinforcing filler (B), hydrophobicization of the filler is preferably carried out in-situ in accordance with the prior art by addition of a hydrophobicizing agent if the filler has not already been separately hydrophobicized beforehand, for example by the process cited above as described in DE 38 39 900 A.

The hydrophobicization is then generally carried out using from 1% to 20% by weight of hexamethyldisilazane and/or divinyltetramethyldisilazane and from 0.5% to 5% by weight of water, in each case based on the total weight of the organopolysiloxane composition, (in-situ silazane process), with these reagents being added to the initially charged organopolysiloxane (A) in a suitable mixing apparatus, for example, kneaders or compounders, before the hydrophilic silica is successively incorporated into the composition.

According to the process of the invention for preparing heat-stable organopolysiloxane compositions which can be crosslinked to give elastomers, it is particularly advantageous to introduce the metal components (D) and (E) in the form of soluble salts of copper and zinc in the water of the in-situ silazane process into the rubber composition.

In a more preferred embodiment, an organic fatty acid (F) is added to the organopolysiloxane (A) at the beginning of the mixing process, if desired simultaneously with the aqueous solution of the copper and zinc salts.

The process of the invention has the advantage that this procedure ensures an almost molecular or finely colloidal distribution of the metal compounds or metal ions in the vulcanizate subsequently produced.

To obtain stiffening-free incorporation of hydrophilic silica as reinforcing filler (B) into the organopolysiloxane (A), the silica surface can furthermore be wetted with processing aids (G) such as low-viscosity polydimethylsiloxanediols.

The viscosities of the processing aids (G) at 25° C. are preferably from 10 to 200 mPas, in particular from 20 to 150 mPas.

The processing aid (G) is used in amounts of preferably from 0 to 30 parts by weight, more preferably from 0 to 20 parts by weight, in each case based on 100 parts by weight of organopolysiloxane (A).

As processing aids (G), it is also possible to use low-viscosity polydimethylsiloxanediols in which a part of the Si-bonded methyl groups is replaced by phenyl groups or vinyl groups, with the density of vinyl groups being determined by means of the iodine number (DIN 53 241). The iodine number is preferably from 1 to 75 g of iodine per 100 g of siloxanediol. The polydiorganosiloxanediols used as processing aids and their preparation are generally known in silicone chemistry.

If the compositions of the invention are prepared from organopolysiloxane (A), hydrophilic silica as reinforcing filler (B) and processing aid (G) without additional in-situ silazane process, it is possible to use the copper component (D) and the zinc component (E) in the form of the respective fatty acid salts of copper and of zinc being advantageously added at the beginning of the preparation process.

The fatty acid salts can be present in pure form or as a solution in an inert, preferably nonpolar, solvent such as, aliphatic or aromatic hydrocarbons. In this procedure, an addition or excess of from 50 to 150 ppm by weight of fatty acid, preferably 2-ethylhexanoic acid, based on the total weight of the organopolysiloxane composition of the invention which are stabilized to heat, is more preferred.

Further reinforcing fillers (B), such as furnace black and acetylene black, can be added to the silicone compositions in amounts of from 0 to 60 parts by weight. The silicone compositions stabilized according to the invention can contain non-reinforcing fillers, either alone or in addition to reinforcing fillers.

A further process for preparing silicone compositions stabilized according to the invention comprises mixing an aliquot of a stabilizer concentrate into organopolysiloxane compositions which are not stabilized in themselves. Such stabilizer concentrates generally have a composition which is the same as or similar to that of the compositions to be stabilized therewith, but do not contain a component (C), i.e., no catalyst or agent which is able to initiate the vulcanization. The copper or zinc content of such a concentrate is not critical; for example, the content of copper and zinc can each be between 500 and 5,000 ppm by weight, based on the total concentrate composition, and the content of fatty acid can be between 5,000 and 50,000 ppm by weight, based on the total concentrate composition. However, what is critical to the heat-stabilizing action to be achieved is the amount of the concentrate which is to be introduced into the organopolysiloxane composition to be stabilized, so that the resulting content of copper, zinc and fatty acid is within the concentration ranges of the invention.

The calculated and measured amount of the concentrate containing copper and zinc is preferably mixed at the beginning of the preparation process into the organopolysiloxane composition to be stabilized, to ensure as complete as possible a dispersion of the copper or zinc component in the organopolysiloxane composition.

The present invention further provides a stabilizer concentrate which contains a copper compound in an amount of more than 180 ppm calculated as elemental copper, a zinc compound in an amount of more than 180 ppm calculated as elemental zinc, in each case based on the total weight of the stabilizer concentrate, organopolysiloxane and, optionally, further materials.

The organopolysiloxane compositions which are stabilized to heat and are according to the invention or prepared according to the invention can then be allowed to crosslink by generally known methods. Reference is made to, for example, M. Wick, G. Kreis and F.-H. Kreuzer in: Ullmanns Encyclopädie der technischen Chemie, Weinheim 1982, or J. C. Weis in: Progress of Rubber Technology, Ed. S. H. Morell, pp. 85–106. Elsevier Applied Science Publishers, Ltd., England 1984.

The elastomers obtained have high stability to heat.

The organopolysiloxane compositions of the invention which are stabilized to heat and can be crosslinked to give elastomers have the advantage that the addition of copper and zinc together in low concentration greatly increases the hot-air stability of silicone rubber, with this affect being considerably increased further by addition of organic fatty acids.

The organopolysiloxane compositions of the invention which are stabilized to heat and can be crosslinked to give elastomers have the advantage that owing to the very low copper and zinc content they have very little inherent color and are transparent, so that, they can be colored without difficulty using commercial color pastes without interfering with or covering the inherent color of added pigments.

Furthermore, the silicone vulcanizates of the invention or prepared according to the invention have the advantage that, owing to their low copper and zinc contents, they are toxicologically acceptable, which considerably expands their ability to be used in industry.

The organopolysiloxane compositions of the invention and also the elastomers prepared according to the invention can be used for all purposes for which organopolysiloxane compositions which can be crosslinked to give elastomers, or elastomers themselves, have been used. In particular, the organopolysiloxane compositions of the invention and the elastomers prepared therefrom according to the invention are suitable for application areas in which heat stability is required. Examples of such applications are, in automobile construction; seals for drive shafts, oil sumps, radiator caps, protective caps for spark plugs, distributors, ignition coils, fabric-reinforced hoses for heating systems and turbo chargers and also ignition lead insulation and exhaust suspensions; in the electrical industry; cable insulation for electric kitchen stoves and microwave ovens, broilers, clothes irons and also automatic coffee makers; in the foodstuffs area: seals for baking ovens, thermos flasks and sterilization cabinets.

In the examples described below all parts and percentages are by weight, unless otherwise indicated. Furthermore, all viscosities are at a temperature of 25° C. If not otherwise indicated, the following examples were carried out at the pressure of the surrounding atmosphere, i.e., at about 20° C., or at the temperature which is established on combining the reactants at room temperature without additional heating or cooling.

Vi is a vinyl radical and

Me is a methyl radical.

The abbreviations used in the tables have the following meanings:

TS=tensile strength (DIN 53504)
M 100%=modulus at 100% elongation
M 300%=modulus at 300% elongation
EB=elongation at break (DIN 53504)
RTP=resistance to tear propagation (ASTM D 624 B)
RR=rebound resilience (DIN 53512)
Wt.loss=weight loss on heat treatment or hot storage
PS=permanent set (DIN 53517, 22 hrs. at 175° C.)
Mooney=Mooney viscosity (plasticity) (DIN 53523 L, 1+4)

EXAMPLE 1

General experimental description, also applicable to Examples 2 to 6 and Comparative Examples 1 to 6.

Organopolysiloxane A is a high-molecular-weight polydimethylsiloxane of the formula $(Me_2ViSiO_{1/2})_2(Me_2SiO)_x(MeViSiO)_y$ with $x \gg y$, so that on a statistical average each 3200th silicon atom in the chain bears a vinyl group, corresponding to a vinyl content of 0.03% by weight of $CH=CH_2$. The Brabender value of 540–600 mkp gives a mean molecular weight of about 450,000 g/mole.

Crosslinker C2 is a 50% strength suspension of bis(2,4-dichlorobenzoyl) peroxide in trimethylsilyl-terminated polydimethylsiloxane having a viscosity of 350 mm²/s (commercially available under the description AK 350 from Wacker-Chemie GmbH).

Crosslinker C1 is dicumyl peroxide.

The preparation of the organosiloxane composition is carried out in laboratory kneaders from Werner und Pfleiderer, Stuttgart, model LUK 1.0 KS and LUK 2.5 KS. During the mixing process, the kneading blades rotate at 28 and 42 rpm respectively.

Two parts of water or an aqueous solution of the transition metal salts $CuCl_2 \cdot 2\,H_2O$ and $ZnCl_2$ and z parts of 2-ethylhexanoic acid are added to 100 parts of an initially charged organopolysiloxane A and are worked in for 5 minutes at a temperature of 50° C., with the concentrations of the transition metal salts in the aqueous solution and also z being selected in such a way that the concentrations of copper, zinc and 2-ethylhexanoic acid given in the following tables are achieved. Subsequently, 7 parts of hexamethyldisilazane are added and the mixture is homogenized for 20 minutes at 50° C. A total of 44.4 parts of pyrogenic silica having a BET surface area of 300 m²/g (commercially available under the description "HDK T 30" from Wacker-Chemie GmbH) in 6 or 7 portions are then successively introduced into the mixture over a period of about 5 minutes in each case.

After addition is complete, the mixture is heated to 150° C. over a period of 10–20 minutes and is then kneaded in an oil pump vacuum for an additional 3 hours at this temperature. After cooling, the organopolysiloxane composition thus obtained is divided in two and, on a laboratory roll mill at a friction of 1:1.1 over a period of 10 minutes in each case, 1.5% of crosslinker C2 is incorporated at room temperature into one half and 0.7% of crosslinker C1 is incorporated at 45° C. into the other half, with the percentages in each case being based on the total weight of the organopolysiloxane composition.

The two peroxide-containing mixtures thus obtained are each placed in pressing molds of stainless steel and, depending on the crosslinker, vulcanized for either 10 minutes at 140° C. (crosslinker C2) or 15 minutes at 170° C. (crosslinker C1) in a laboratory press. Subsequently, the vulcanizates are removed from the mold and heat treated for an additional 4 hours at 200° C. in a circulated-air drying oven having an air change rate of about 100 liters of air per kg of silicone rubber per minute.

The mechanical properties are determined on test specimens made from 2 mm thick films after hot-air storage for 48 hours at 250° C. and compared with those of the vulcanizates heat treated for 4 hours at 200° C. The results are shown in the corresponding tables.

Table 1—The organopolysiloxane composition contains 5 ppm Cu and 5 ppm Zn, in each case based on the total weight of the rubber composition, and no 2-ethylhexanoic acid, i.e. z=0

| Crosslinker | C2 | | C1 | |
|---|---|---|---|---|
| Time, temp. | 4h 200° C. | 48h 250° C. | 4h 200° | 48h 250° C. |
| Shore A | 50 | 56 | 46 | 54 |
| TS [N/mm²] | 12.8 | 7.9 | 12.8 | 7.0 |
| M 100% | 0.9 | 2.4 | 1.2 | 2.1 |
| M 300% | 2.6 | 7.2 | 4.4 | 5.8 |
| EB [%] | 540 | 320 | 670 | 350 |
| RTP [N/mm] | 37.6 | 18.9 | 26.3 | 20.3 |
| RR [%] | 51 | 50 | 44 | 44 |
| Wt. loss [%] | 0.85 | 1.78 | 0.82 | 1.78 |
| PS [%] | 48/49 | 24/23 | 27/26 | 18/20 |
| Mooney | | 53–47 | | |

EXAMPLE 2

Table 2—the organopolysiloxane composition contains 10 ppm Cu and 10 ppm Zn, in each case based on the total weight of the rubber composition, and no 2-ethylhexanoic acid, i.e., z=0

| Crosslinker | C2 | | C1 | |
|---|---|---|---|---|
| Time, temp. | 4h 200° C. | 48h 250° C. | 4h 200° | 48h 250° C. |
| Shore A | 48 | 54 | 46 | 54 |
| TS [N/mm²] | 12.9 | 7.6 | 12.6 | 7.1 |
| M 100% | 1.2 | 2.1 | 0.9 | 1.9 |
| M 300% | 4.2 | 6.7 | 2.5 | 5.4 |
| EB [%] | 560 | 330 | 670 | 370 |
| RTP [N/mm] | 27.5 | 19.0 | 34.3 | 20.9 |
| RR [%] | 52 | 49 | 44 | 45 |
| Wt. loss [%] | 0.88 | 1.70 | 0.89 | 1.75 |
| PS [%] | 48/48 | 24/22 | 27/22 | 18/18 |
| Mooney | | 51–46 | | |

EXAMPLE 3

Table 3—The organopolysiloxane composition contains 10 ppm Cu, 10 ppm Zn, and 100 ppm 2-ethylhexanoic acid, in each case based on the total weight of the rubber composition

| Crosslinker | C2 | | C1 | |
|---|---|---|---|---|
| Time, temp. | 4h 200° C. | 48h 250° C. | 4h 200° | 48h 250° C. |
| Shore A | 41 | 47 | 42 | 45 |
| TS [N/mm²] | 12.9 | 9.6 | 12.1 | 8.3 |
| M 100% | 0.8 | 1.4 | 0.7 | 1.2 |
| M 300% | 2.8 | 5.4 | 1.7 | 3.8 |
| EB [%] | 620 | 440 | 750 | 530 |
| RTP [N/mm] | 30.5 | 24.8 | 37.7 | 28.8 |
| RR [%] | 43 | 45 | 41 | 37 |
| Wt. loss [%] | 1.51 | 1.73 | 1.50 | 1.62 |
| PS [%] | 42/40 | 19/20 | 23/25 | 15/18 |
| Mooney | | 35–33 | | |

EXAMPLE 4

Table 4—The organopolysiloxane composition contains 20 ppm Cu, 20 ppm Zn, and 100 ppm 2-ethylhexanoic acid, in each case based on the total weight of the rubber composition

| Crosslinker | C2 | | C1 | |
|---|---|---|---|---|
| Time, temp. | 4h 200° C. | 48h 250° C. | 4h 200° | 48h 250° C. |
| Shore A | 46 | 51 | 44 | 48 |
| TS [N/mm²] | 13.0 | 8.9 | 11.2 | 8.3 |
| M 100% | 1.0 | 1.9 | 0.8 | 1.5 |
| M 300% | 3.4 | 6.7 | 2.0 | 4.9 |
| EB [%] | 590 | 370 | 660 | 450 |
| RTP [N/mm] | 26.3 | 20.3 | 34.4 | 24.7 |
| RR [%] | 49 | 49 | 46 | 42 |
| Wt. loss [%] | 1.05 | 1.88 | 0.99 | 1.78 |
| PS [%] | 43/44 | 18/19 | 23/23 | 16/14 |
| Mooney | | 47–40 | | |

EXAMPLE 5

Table 5—The organopolysiloxane composition contains 35 ppm Cu, 35 ppm Zn, and 100 ppm 2-ethylhexanoic acid, in each case based on the total weight of the rubber composition

| Crosslinker | C2 | | C1 | |
|---|---|---|---|---|
| Time, temp. | 4h 200° C. | 48h 250° C. | 4h 200° | 48h 250° C. |
| Shore A | 47 | 53 | 46 | 53 |
| TS [N/mm²] | 13.4 | 8.3 | 18.8 | 7.9 |
| M 100% | 1.0 | 2.1 | 0.8 | 1.9 |
| M 300% | 3.6 | 6.8 | 2.3 | 5.9 |
| EB [%] | 610 | 350 | 680 | 380 |
| RTP [N/mm] | 29.3 | 18.8 | 34.7 | 20.5 |
| RR [%] | 48 | 48 | 43 | 45 |
| Wt. loss [%] | 0.86 | 1.48 | 0.92 | 1.31 |
| PS [%] | 53/53 | 18/18 | 25/26 | 13/13 |
| Mooney | | 48–45 | | |

COMPARATIVE EXAMPLE 1

Table 6—The organopolysiloxane composition contains neither Cu nor Zn nor 2-ethylhexanoic acid

| Crosslinker | C2 | | C1 | |
|---|---|---|---|---|
| Time, temp. | 4h 200° C. | 48h 250° C. | 4h 200° | 48h 250° C. |
| Shore A | 49 | 69 | 47 | 61 |
| TS [N/mm²] | 11.4 | 4.2 | 12.2 | 4.0 |
| M 100% | 1.2 | — | 0.9 | — |
| M 300% | 4.4 | — | 2.6 | — |
| EB [%] | 512 | 70 | 670 | 70 |
| RTP [N/mm] | 28.8 | 5.1 | 35.6 | 6.3 |
| RR [%] | 51 | 58 | 46 | 51 |
| Wt. loss [%] | 1.12 | 2.39 | 1.03 | 2.14 |
| PS [%] | 48/48 | 22/22 | 27/28 | 20/20 |
| Mooney | | 59–53 | | |

COMPARATIVE EXAMPLE 2

Table 7—The organopolysiloxane composition contains neither Cu nor Zn, but 100 ppm 2-ethylhexanoic acid, based on the total weight of the organopolysiloxane composition.

| Crosslinker | C2 | | C1 | |
|---|---|---|---|---|
| Time, temp. | 4h 200° C. | 48h 250° C. | 4h 200° | 48h 250° C. |
| Shore A | 46 | 54 | 44 | 52 |
| TS [N/mm²] | 11.3 | 6.8 | 11.1 | 5.4 |
| M 100% | 1.1 | 2.3 | 0.8 | 2.0 |
| M 300% | 4.1 | — | 2.2 | 5.2 |
| EB [%] | 530 | 300 | 680 | 300 |
| RTP [N/mm] | 26.0 | 19.9 | 34.3 | 18.8 |
| RR [%] | 45 | 47 | 43 | 41 |
| Wt. loss [%] | 1.10 | 1.53 | 1.08 | 1.44 |
| PS [%] | 55/55 | 31/32 | 32/34 | 20/22 |
| Mooney | | 51–46 | | |

COMPARATIVE EXAMPLE 3

Table 8—The organopolysiloxane composition contains 10 ppm Cu, based on the total weight of the organopolysiloxane composition, no Zn and no 2-ethylhexanoic acid

| Crosslinker | C2 | | C1 | |
|---|---|---|---|---|
| Time, temp. | 4h 200° C. | 48h 250° C. | 4h 200° | 48h 250° C. |
| Shore A | 49 | 57 | 47 | 58 |
| TS [N/mm²] | 11.9 | 6.7 | 12.2 | 6.0 |
| M 100% | 1.1 | 2.3 | 0.9 | 2.2 |
| M 300% | 4.2 | — | 2.6 | 5.8 |
| EB [%] | 520 | 290 | 650 | 310 |
| RTP [N/mm] | 27.9 | 18.8 | 34.3 | 17.9 |
| RR [%] | 52 | 49 | 46 | 45 |
| Wt. loss [%] | 1.27 | 2.11 | 1.22 | 2.07 |
| PS [%] | 41/41 | 18/19 | 25/23 | 16/17 |
| Mooney | | 53–45 | | |

COMPARATIVE EXAMPLE 4

Table 9—The organopolysiloxane composition contains 10 ppm Cu and 100 ppm 2-ethylhexanoic acid, in each case based on the total weight of the organopolysiloxane composition, and no Zn

| Crosslinker | C2 | | C1 | |
|---|---|---|---|---|
| Time, temp. | 4h 200° C. | 48h 250° C. | 4h 200° | 48h 250° C. |
| Shore A | 48 | 55 | 46 | 56 |
| TS [N/mm²] | 13.2 | 7.2 | 12.3 | 6.4 |
| M 100% | 1.0 | 2.2 | 0.8 | 2.0 |
| M 300% | 3.6 | 6.5 | 2.2 | 5.5 |
| EB [%] | 590 | 340 | 700 | 350 |
| RTP [N/mm] | 28.2 | 19.4 | 33.4 | 20.7 |
| RR [%] | 50 | 47 | 43 | 44 |
| Wt. loss [%] | 0.97 | 1.97 | 0.88 | 2.18 |
| PS [%] | 47/47 | 20/22 | 24/25 | 15/17 |
| Mooney | | 49–44 | | |

COMPARATIVE EXAMPLE 5

Table 10—The organopolysiloxane composition contains 10 ppm Zn based on the total weight of the organopolysiloxane composition, no Cu and no 2-ethylhexanoic acid

| Crosslinker | C2 | | C1 | |
|---|---|---|---|---|
| Time, temp. | 4h 200° C. | 48h 250° C. | 4h 200° | 48h 250° C. |
| Shore A | 48 | 60 | 46 | 60 |
| TS [N/mm²] | 11.9 | 6.5 | 11.8 | 4.7 |
| M 100% | 1.2 | 3.1 | 0.9 | 3.1 |
| M 300% | 4.3 | — | 2.4 | — |
| EB [%] | 530 | 210 | 680 | 150 |
| RTP [N/mm] | 26.7 | 11.9 | 34.8 | 9.2 |
| RR [%] | 50 | 55 | 43 | 46 |
| Wt. loss [%] | 1.15 | 1.79 | 1.17 | 1.71 |
| PS [%] | 47/48 | 4/7 | 25/28 | 7/9 |
| Mooney | | 49–46 | | |

COMPARATIVE EXAMPLE 6

Table 11—The organopolysiloxane composition contains 10 ppm Zn and 100 ppm 2-ethylhexanoic acid, in each case based on the total weight of the organopolysiloxane composition, and no Cu

| Crosslinker | C2 | | C1 | |
| --- | --- | --- | --- | --- |
| Time, temp. | 4h 200° C. | 48h 250° C. | 4h 200° | 48h 250° C. |
| Shore A | 51 | 66 | 49 | 65 |
| TS [N/mm$^2$] | 12.1 | 5.8 | 12.2 | 5.7 |
| M 100% | 1.3 | 4.9 | 1.0 | 4.7 |
| M 300% | 4.6 | — | 3.0 | — |
| EB [%] | 510 | 120 | 600 | 120 |
| RTP [N/mm] | 24.9 | 7.2 | 32.3 | 6.7 |
| RR [%] | 51 | 61 | 43 | 51 |
| Wt. loss [%] | 0.82 | 2.01 | 0.83 | 1.91 |
| PS [%] | 46/47 | 18/20 | 29/34 | 17/18 |
| Mooney | | 59–52 | | |

EXAMPLE 6

Table 12—The organopolysiloxane composition contains 160 ppm Cu, 160 ppm Zn, and 100 ppm 2-ethylhexanoic acid, in each case based on the total weight of the rubber composition

| Crosslinker | C2 | | C1 | |
| --- | --- | --- | --- | --- |
| Time, temp. | 4h 200° C. | 48h 250° C. | 4h 200° | 48h 250° C. |
| Shore A | 45 | 57 | 47 | 55 |
| TS [N/mm$^2$] | 12.5 | 5.3 | 12.3 | 5.3 |
| M 100% | 0.9 | 2.4 | 0.9 | 2.1 |
| M 300% | 2.9 | — | 2.4 | — |
| EB [%] | 630 | 230 | 660 | 280 |
| RTP [N/mm] | 32.0 | 14.4 | 32.6 | 18.4 |
| RR [%] | 50 | 50 | 46 | 46 |
| Wt. loss [%] | 0.86 | 2.33 | 0.84 | 1.99 |
| PS [%] | 54/55 | 14/14 | 32/32 | 17/14 |
| Mooney | | 54–46 | | |

EXAMPLE 7

An HTV rubber composition is prepared using the procedure described in example 1, except that the two parts of an aqueous solution of the transition metal salts CUCl$_2$.2 H$_2$O and ZnCl$_2$ are replaced by as many parts of a hydrophilic silica doped with copper and zinc as are necessary to achieve the Cu and Zn concentrations given in Table 13 in the rubber composition.

Thus, 10.2 parts of a hydrophilic silica doped with 140 ppm by weight Cu and 140 ppm by weight Zn, as described in the German Application No. P 43 36 345.8 already cited in the introduction, are mixed with 34.2 parts of the above described pyrogenic silica having a BET surface area of 300 m$^2$/g (commercially available under the description "HDK T 30" from Wacker-Chemie GmbH) and this silica mixture is incorporated into the siloxane mixture as described in Example 1.

Table 13—The organopolysiloxane composition contains 10 ppm Cu and 10 ppm Zn, in each case based on the total weight of the rubber composition, and no 2-ethylhexanoic acid, i.e. z=0

| Crosslinker | C2 | | C1 | |
| --- | --- | --- | --- | --- |
| Time, temp. | 4h 200° C. | 48h 250° C. | 4h 200° | 48h 250° C. |
| Shore A | 46 | 51 | 45 | 50 |
| TS [N/mm$^2$] | 11.7 | 8.3 | 11.2 | 7.6 |
| M 100% | 1.0 | 1.9 | 0.8 | 1.6 |
| M 300% | 3.5 | 5.9 | 2.2 | 4.8 |
| EB [%] | 560 | 380 | 650 | 430 |
| RTP [N/mm] | 27.6 | 21.2 | 31.3 | 23.1 |
| RR [%] | 47 | 47 | 43 | 41 |
| Wt. loss [%] | 0.88 | 1.81 | 0.89 | 1.74 |
| PS [%] | 46/45 | 15/17 | 19/21 | 15/16 |
| Mooney | | 44–41 | | |

EXAMPLE 8

A stabilizer concentrate is first prepared, using a procedure similar to that described in Example 1, by making up a peroxide-free HTV rubber composition containing 1,000 ppm by weight of copper (as CUCl$_2$.2 H$_2$O), 1,000 ppm by weight of zinc (as ZnCl$_2$) and 10,000 ppm by weight of 2-ethylhexanoic acid, in each case based on the total weight of the stabilizer concentrate.

One part of the stabilizer concentrate thus obtained is added to 100 parts of a similar HTV rubber mixture without heat stabilizer and the mixture is divided in two. The two parts are further processed as described in Example 1.

Table 14—The organopolysiloxane composition contains 10 ppm Cu, 10 ppm Zn and 100 ppm 2-ethylhexanoic acid, in each case based on the total weight of the rubber composition

| Crosslinker | C2 | | C1 | |
| --- | --- | --- | --- | --- |
| Time, temp. | 4h 200° C. | 48h 250° C. | 4h 200° | 48h 250° C. |
| Shore A | 46 | 52 | 45 | 52 |
| TS [N/mm$^2$] | 11.8 | 7.8 | 12.1 | 6.8 |
| M 100% | 1.0 | 2.0 | 0.9 | 1.8 |
| M 300% | 3.9 | 6.2 | 2.6 | 5.3 |
| EB [%] | 540 | 360 | 660 | 380 |
| RTP [N/mm] | 26.3 | 21.6 | 31.8 | 21.4 |
| RR [%] | 51 | 48 | 47 | 42 |
| Wt. loss [%] | 1.01 | 1.81 | 0.94 | 1.72 |
| PS [%] | 44/45 | 23/26 | 20/21 | 21/24 |
| Mooney | | 45–42 | | |

EXAMPLE 9

The procedure described in Example 1 is repeated except that as many parts of zirconium in the form of ZrSiO$_4$ are additionally introduced as are required to obtain the concentration of zirconium given in Table 15.

Table 15—The organopolysiloxane composition contains 100 ppm Cu, 100 ppm Zn, 340 ppm Zr and 300 ppm 2-ethylhexanoic acid, in each case based on the total weight of the rubber composition

| Crosslinker | C2 | | C1 | |
|---|---|---|---|---|
| Time, temp. | 4h 200° C. | 48h 250° C. | 4h 200° | 48h 250° C. |
| Shore A | 38 | 49 | 40 | 45 |
| TS [N/mm²] | 11.3 | 6.9 | 10.5 | 6.4 |
| M 100% | 0.7 | 1.5 | 0.7 | 1.3 |
| M 300% | 2.0 | 4.6 | 1.7 | 4.0 |
| EB [%] | 690 | 400 | 720 | 450 |
| RTP [N/mm] | 30.9 | 21.5 | 33.6 | 23.7 |
| RR [%] | 38 | 40 | 41 | 36 |
| Wt. loss [%] | 1.01 | 2.08 | 1.00 | 1.91 |
| PS [%] | 45/44 | 19/18 | 28/30 | 17/17 |
| Mooney | | 51–41 | | |

EXAMPLE 10

The procedure described in Example 1 is repeated except that as many parts of zirconium in the form of $ZrSiO_4$ are additionally introduced as are required to obtain the concentration of zirconium given in Table 16.

Table 16—The organopolysiloxane composition contains 100 ppm Cu, no Zn, 100 ppm Zr and 200 ppm 2-ethylhexanoic acid, in each case based on the total weight of the rubber composition

| Crosslinker | C2 | | C1 | |
|---|---|---|---|---|
| Time, temp. | 4h 200° C. | 48h 250° C. | 4h 200° | 48h 250° C. |
| Shore A | 47 | 52 | 49 | 53 |
| TS [N/mm²] | 13.0 | 6.7 | 12.8 | 8.1 |
| M 100% | 1.0 | 2.0 | 1.0 | 1.9 |
| M 300% | 3.3 | 5.7 | 2.9 | 5.3 |
| EB [%] | 630 | 350 | 640 | 420 |
| RTP [N/mm] | 31.4 | 21.7 | 33.0 | 24.0 |
| RR [%] | 46 | 44 | 45 | 44 |
| Wt. loss [%] | 1.02 | 1.76 | 1.00 | 1.59 |
| PS [%] | 51/51 | 21/21 | 30/31 | 17/17 |
| Mooney | | 54–47 | | |

What is claimed is:

1. An organopolysiloxane composition which is stabilized to heat and can be crosslinked to give elastomers, comprising:
(A) organopolysiloxanes consisting essentially of units of the formula $$R_aSiO_{\frac{4-a}{2}} \quad (I)$$

where
R is identical or different on each appearance and is an unsubstituted or substituted hydrocarbon radical and
a is 0, 1, 2 or 3 and has an average numerical value of from 1.9 to 2.1,
(B) optionally, reinforcing and/or non-reinforcing fillers,
(C) a catalyst promoting the crosslinking of the organopolysiloxane compositions or an agent effecting the crosslinking,
(D) a copper compound in an amount of from 1 to 180 ppm by weight calculated as elemental copper, and based on the total weight of the organopolysiloxane composition,
(E) a zinc compound in an amount from 1 to 180 ppm by weight calculated as element zinc and based on the total weight of the organopolysiloxane composition, and
(F) optionally, an organic fatty acid.

2. An organopolysiloxane composition as claimed in claim 1, wherein the composition is a single-component, silicone system containing an organic peroxide.

3. An organopolysiloxane composition which is stabilized to heat and can be crosslinked to give elastomers, which contains a stabilizer combination:
(D) a copper compound in an amount of from 1 to 180 ppm by weight calculated as elemental copper,
(E) a zinc compound in an amount from 1 to 180 ppm by weight calculated as elemental zinc, in each case based on the total weight of the organopolysiloxane composition which is stabilized to heat and can be crosslinked to give elastomers, and
(F) optionally, organic fatty acid,
wherein the components (D) and (E) are silica doped with zinc and copper.

4. An organopolysiloxane composition as claimed in claim 1, wherein components (D) and (E) are a stabilizer concentrate containing a copper compound in an amount of more than 180 ppm calculated as elemental copper, a zinc compound in an amount of more than 180 ppm calculated as elemental zinc, in each case based on the total weight of the stabilizer concentrate, organopolysiloxane and, optionally, processing aids and additives.

5. The composition of claim 1 wherein (c) is an organic peroxide.

6. The composition of claim 1 wherein said organic fatty acid is present in an amount of from 50 ppm to 300 ppm based on the total weight of said organopolysiloxane composition.

7. The composition of claim 1 wherein said organic fatty acid is present in an amount of from 50 ppm to 150 ppm based on the total weight of said organopolysiloxane composition.

8. The composition of claim 1 wherein said zinc compound and said copper compound are each present in amounts of from 2 to 90 ppm based on the total weight of said organopolysiloxane composition.

9. The composition of claim 1 wherein said zinc compound and said copper compound are each present in amounts of from 4 to 40 ppm based on the total weight of said organopolysiloxane composition.

10. The composition of claim 1 wherein said zinc compound is selected from the group consisting of $ZnCl_2$ and $ZnSO_4$ and wherein said copper compound is selected from the group consisting of $CuCl_2$ and $CuSO_4$.

11. The composition of claim 8 wherein said zinc compound is selected from the group consisting of $ZnCl_2$ and $ZnSO_4$ and wherein said copper compound is selected from the group consisting of $CuCl_2$ and $CuSO_4$.

12. The composition of claim 9 wherein said zinc compound is selected from the group consisting of $ZnCl_2$ and $ZnSO_4$ and wherein said copper compound is selected from the group consisting of $CuCl_2$ and $CuSO_4$.

\* \* \* \* \*